Feb. 21, 1967 F. A. BELLINGHER 3,305,114
PORTABLE DEVICE AND METHOD FOR REMOVABLY
LOADING VEHICLES ON CARRIERS
Filed Dec. 21, 1964 2 Sheets-Sheet 2
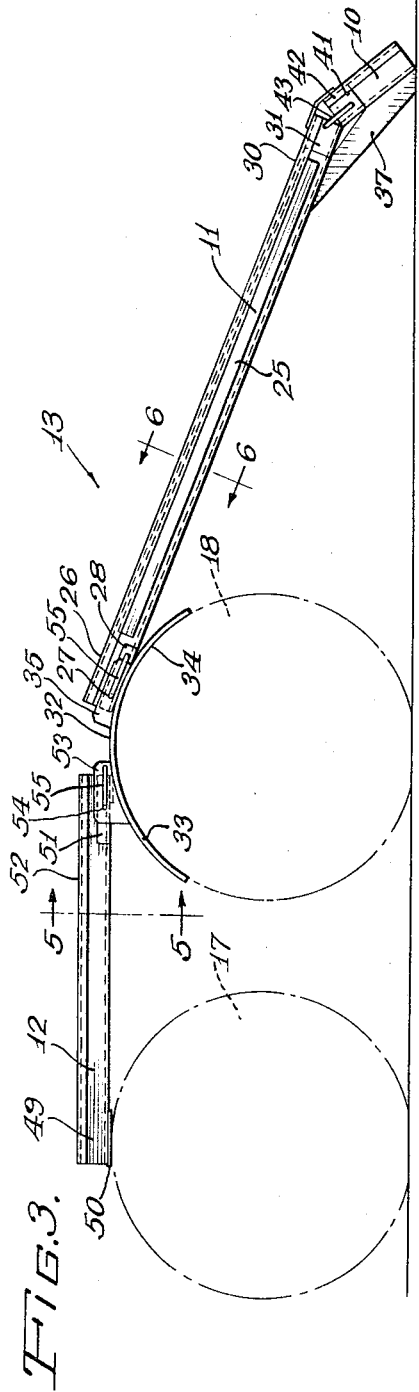
Inventor:
Fred A. Bellingher
By Frederick J. Kube
Atty.

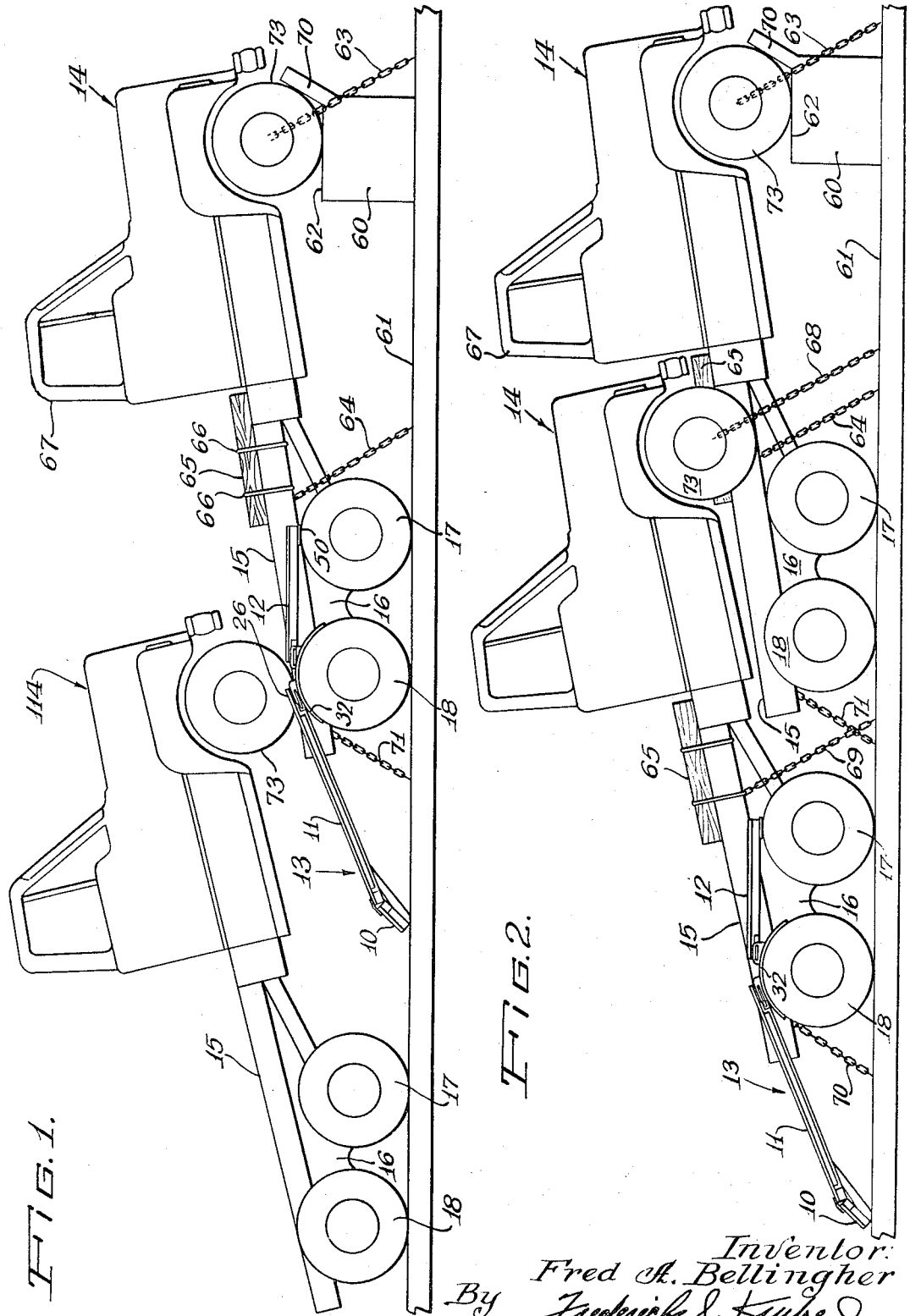

United States Patent Office 3,305,114
Patented Feb. 21, 1967

3,305,114
PORTABLE DEVICE AND METHOD FOR REMOVABLY LOADING VEHICLES ON CARRIERS
Fred A. Bellingher, Alsip, Ill., assignor to International Harvester Company, Chicago, Ill., a corporation of New Jersey
Filed Dec. 21, 1964, Ser. No. 420,006
7 Claims. (Cl. 214—85)

This invention relates to means and methods for loading and unloading vehicles on carriers. Particularly the invention relates to a portable track construction and method for loading or unloading from carriers, truck chassis and the like in transporting them from one place to another.

When a carrier for transporting of vehicles is employed, a controlling factor in determination of the class of carrier is the unit cost of transportation.

Using rail cars to transport vehicles has been and is conventionally practiced. The prior art teaches use of rail box cars in which vehicles are tied in raised, staggered and spaced apart positions. More recently, vehicles have been transported mounted in conventional trailers which are adapted to be hauled by highway truck tractors by loading the trailers on rail flat cars. However, under some circumstances in which rail might or could be used, other carriers are employed because they are less expensive.

In instances in which rail transport is more expensive than, for example, trucking, higher cost may result from the need to employ labor or expensive capital equipment the cost of which when added to other costs precludes use of rail. For example, when employing a box car to ship truck chassis, special heavy hoisting equipment is required to lift into and lower from supported staggered positions truck chassis. For a short trip, the cost which would have to be added to each transported vehicle for such heavy equipment use and the labor required therefor preclude rail box cars. Furthermore, when employing a rail flat car to ship truck chassis, a road trailer or framework is required during the entire trip to permit maximum use of the flat car and to hold the shipped vehicles on the surface and above each other. In particular circumstances, the cost which would have to be added for each transported vehicle because of the use of the capital equipment, namely, the trailer or framework, precludes use of rail.

By eliminating the use of heavy capital equipment and providing a portable construction for removably loading truck chassis in saddleback arrangement on rail flat cars, shipping costs per vehicle can be minimized by removing the requirement to include as a factor of shipping cost use of expensive capital equipment. As a consequence, the further cost factor of labor to operate such heavy equipment is also eliminated.

In accordance with the instant invention and as an object thereof, an improved apparatus and process are provided for removably loading vehicles on carriers and the like.

It is another object of the instant invention to provide a novel portable track for loading and unloading truck chassis in and from saddleback or piggyback position to facilitate shipment thereof on a flat carrier or the like.

It is an additional object of the instant invention to provide a novel method for arranging vehicles, with respect to each other, for shipment on a flat rail car or the like, whereby minimal shipping surface area is required per vehicle.

It is a further object of the instant invention to provide a portable apparatus and method for arranging vehicles in piggyback or saddleback position to facilitate transport thereof on a flat surface without employment of specialized equipment to hold the vehicles during transportation.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a side elevational view of a pair of trucks being mounted in piggyback fashion in accordance with the method and employing the truck loading apparatus embodying one form of the instant invention.

FIG. 2 is a view similar to FIG. 1, however showing the trucks in finally adjusted positions with the truck loading apparatus having been moved from the position shown in FIG. 1.

FIG. 3 is an enlarged side elevational view of the truck loading apparatus, the tires of a truck being shown in dotted lines.

FIG. 4 is a plan view looking downwardly at the top of FIG. 3.

FIG. 5 is a transverse sectional view taken substantially on the line 5—5 of FIG. 3 and looking in the direction of the arrows.

FIG. 6 is a transverse sectional view taken substantially on the line 6—6 of FIG. 3 and looking in the direction of the arrows.

FIG. 7 is a longitudinal sectional view of a portion of said apparatus taken along the line 7—7 of FIG. 4 and looking in the direction of the arrows.

Referring now to the drawings, more particularly to FIGS. 3, 4, 5, 6 and 7, the truck mounting or loading apparatus is a track structure generally designated by nuferal 13. Track structure 13 may comprise three track sections 10, 11 and 12, which are connected together to provide a guide in which the front tire of one side of a truck is adapted to ride and by which such front tire will be guided in a manner hereinafter to be described. The track structure 13 may be used in pairs with one for each side of a truck. Only a single track structure 13 is shown in each view of the drawings, as the details of construction and the manner of employment of another thereof will be evident from the following description.

Referring now to FIGS. 1 and 2, the pair of trucks 14 and 114 therein shown are substantially identical. However, they need not be, inasmuch as the invention will accommodate vehicles of varying sizes, as will become apparent hereinafter.

Most of the details of construction of the trucks 14 and 114 are of no significance with respect to this invention. Consequently such details will not be identified here. Attention is invited, however, to the rearwardly extending base, platform or flat 15 of each of the trucks 14 and 114 which may be integral with its chassis which may support a conventional rear axle carriage 16. Thereby, each of the trucks 14 and 114 can carry a plurality of pairs of rear wheels 17 and 18 which are spaced longitudinally and extend transversely of their respective trucks, in a conventional manner.

Track sections 10 and 11 comprise a ramp. The section 11, which is the main ramp section, comprises an elongated U-shaped or channel member 19, as illustrated in FIG. 6. Channel member 19 is preferably of metal fabrication and is characterized by a base 20 and a pair of integral preferably vertical side walls 21 and 22 which extend the length of the channel member 19 and are bent upwardly from the opposite sides of the base 20. Each of the side walls 21 and 22 has an elongated integral upper end flange 23 bent outwardly at a right angle from and extending the length of the channel 19. Each of the flanges 23 has an elongated downwardly bent right angular depending end portion or lip 24 which extends the length of channell member 19. Thereby, each of the flanges 23, in cross section, looks like an L which has been rotated 90°, as illustrated in FIG. 6.

The track section 11 may be provided with a pair of elongated narrow flat ribs 25 or the like which are disposed in parallel relationship and secured on opposite elongated medial portions of the outer surfaces of channel side walls 21 and 22, respectively, in a manner illustrated in FIGS. 3 and 6.

At the forward end portion 26 of the track section 11, there are provided in the side walls 21 and 22 a pair of transversely aligned apertures 29 which accommodate therein a releasable mounted transversely extending tie pin or rod 27 the function of which will be described in detail hereinafter.

As illustrated in FIGS. 3 and 6, a pair of small, apertured, flat and parallel reinforcing plates 28 are mounted on the outer surfaces of side walls 21 and 22, respectively, at the forward end portion 26 of track section 11 about the apertures 29. Thereby, plates 28, by reason of the apertures therein, are adapted to accommodate rod or pin 27, as illustrated in the drawings. At its opposite or rear end portion 30, channel member 11 has secured to the outer surfaces of opposite side walls 21 and 22, respectively, a pair of small plates 31, as illustrated in FIGS. 6 and 7.

An arcuate track or ramp supporting member or base 32 is adapted to be placed as a cap upon the top of a tire 18 in the manner illustrated in the drawings. The radius of curvature of the ramp base or support 32 is preferably the same as the radius of curvature of the tire 18 upon which said base or ramp supporting member 32 will be positioned. The ramp base or supporting member 32 is preferably of metal fabrication. It is adapted to support the end portion 26 which when in use is normally the upper and forward end portion of the track section 11.

When the ramp base or support member 32 is employed in the manner hereinafter to be described, it is preferably centered with respect to the vertical axis of the tire 18, for evident mechanical reasons. Such centering divides the ramp base or support member 32 into a forward end portion 33 and a rearward end portion 34, as clearly illustrated in FIGS. 3, 4, 5 and 6. As illustrated in FIG. 4, the width of the ramp base or channel support 32 may be substantially wider than the tire 18.

A pair of upwardly extending plates, arms or bosses 35 of suitable fabrication, preferably metal, have their lower end portions rigidly secured by any suitable means, which may be welding or the like, to the top of the ramp support 32. The securance of the plates 35 is on the rear end base portion 34 adjacent to juncture with the front end portion 33 of said ramp base or suppport 32. The plates or bosses 35 are flat and are parallel to and spaced apart from each other transversely of the ramp base or support 32. The bosses or plates 35 together with the top of the support member 32 disposed therebetween form a channel in which the upper end portion 26 of track section 11 is adapted to be mounted. When thusly mounted, the plates or bosses 35 are disposed adjacent side members 21 and 22, respectively, between an associated flange 24 and the outer surface of its associated side member 21 or 22, as illustrated in the drawings.

Each plate, boss or arm 35 has an aperture 36 aligned with the other thereof, and, when the channel or track section 11 is mounted in operable position, with the apertures 29, and also with the apertures in the plates 28. Thereby, the pin 27 when extended through all of the aforesaid apertures locks the track section 11 to the ramp base or support 32, in the manner illustrated in the drawings.

It is appreciated that the apertures 36 and 29 are disposed adjacent the bottom of the track section 11, preferably at a level which will cause rod or pin 27 to lie against base 20. Thus, the channel formed in the track will neither be needlessly obstructed nor movement of a vehicle impeded.

The track section 10 is the outer and lowermost of the ramp sections. It is secured to the lower and outermost end portion 30 of track section 11 by means of an angularly disposed brace 37 which at one end thereof is rigidly secured, by welding or the like, to the undersurface of base 20 and at the other end portion thereof by welding or the like to the undersurface of the base 38 of track section 10. By means of the aforesaid securance, the fixed angular relationship with the track section 10 being track or ramp sections 10 and 11 are rigidly secured in disposed at a larger angle to the horizontal than the track section 11, as illuustrated in FIGS. 1, 2, 3 and 7.

In cross section, the track or ramp section 10 is a channel similar to that of track or ramp section 11. The track or ramp section 10, however, is substantially shorter than the track or ramp section 11. A pair of angularly bent straps or bands 39 are secured, respectively, to the flanges 23 of the ramp or track section 11 and the corresponding flanges 40 of the track or ramp section 10. The securance may be on the tops of said flanges 23 and 40 by any suitable means, such as welding or the like. The sizes of the angles of said straps or bands 39 are determined by the angular disposition of connected together flanges 23 and 40.

A plate 41, which is similar to the plate 31, is rigidly secured on the outer surface of each side wall 42 of the track or ramp section 10 adjacent its forward end portion. A chain or link 43 extends through the side wall 22 and plate 31 and the outer of the side walls 42 and the plate 41 secured thereon, to additonally tie track or ramp sections 10 and 11 together, as illustrated in FIGS. 3 and 4.

With a single bogie tractor or tractor having only one pair of rear wheels, the device may be employed as heretofore described with omission of the track section 12. However, when a dual bogie is employed, that is, a tractor with two sets or pairs of rear wheels 17 and 18, a bridge will be required between wheels 17 and 18. Track section 12 provides that bridge. Its length is preferably equal to about the distance between centers of tires 17 and 18 to perform adequately its function.

In cross section, as illustrated in FIG. 5, the track section 12 is quite similar to the track or ramp section 11. Track section 12 comprises a channel-like member having an elongated flat base or floor 44 extending the length of section 12 and a pair of integral opposite parallel upwardly extending side walls 45 and 46 defining the channel for the length of section 12. An integral elongated right angular flange 47 extends outwardly from each of the side walls 45 and 46, and each flange 47 has a downwardly bent right angular extension 48 extending the length of channel 12, as illustrated in the drawings.

A flat cleat 50 or the like is rigidly secured by welding or the like to the outer surface of the base 44 at the forward end portion 49 of the bridge or track section 12. The cleat 50 provides a rest, support or base adapted to be seated on the top of a tire 17 to support the forward end of the bridge section 12, as illustrated in FIGS. 1, 2, 3 and 4. As illustrated in FIG. 4, the cleat 50 may comprise a pair of separated plates which extend outwardly from sides 45 and 46.

A pair of reinforcing plates 51 are rigidly secured to the outer surfaces of side walls 45 and 46 at the rear or inner end portion 52 of the track section or bridge 12.

As illustrated in the drawings, a pair of upwardly extending plates, arms or bosses 53 have their lower end portions rigidly secured to the upper surface of base or support section 33. The arms, bosses or plates 53 are disposed parallel to each other and are mounted adjacent the base or support section 34, whereby said arms, bosses or plates 53 will be disposed on top of the tire 18 when the base or support member 32 is mounted in operable position, as illustrated in the drawings. The spacing of the arms, bosses or plates 53 from each other is such that they will accommodate therebetween the inner or rear end portion 52 of the bridge or track section 12. When mounted in operable position, plates 53 will be disposed between respective side walls 45 and 46 and associated flange extensions 48 in a manner illustrated well in FIG. 5.

The side walls 45 and 46, as well as the plates 51 connected thereto, have aligned apertures which are also alignable with apertures in the plate 53, whereby a transversely extendable pin or rod 54 will be accommodated adjacent base 44 to lock the bridge or track section 12 with respect to the track holding member 32, in the manner illustrated in the drawings.

Each of the pins 27 and 54 has an outwardly extending handle 55 to facilitate mounting and withdrawal of said pins, thereby to lock and unlock the track sections 11 and 12 with respect to the holding or supporting member 32. Upon unlocking of the track sections 11 and 12 from the base holding or connecting member 32, the track or channel members 11 and 12 may be separated from each other and also from the base holding or connecting member 32, and stored independently.

Having thus described the details of the structural features of the invention, reference is now had to FIGS. 1 and 2, in which the manner of use of the device is illustrated and will now be described.

A pedestal 60, the height of which may be equal to the diameter of the tires 17 and 18, is mounted or disposed on a forward end portion of a flat 61 of a rail car, for example, in a position to support the foremost or first truck or vehicle 14 in a row thereof, in the manner shown in FIGS. 1 and 2. Track or ramp sections 10 and 11 are then mounted with the forward end portion 26 of the ramp or track section 11 mounted or disposed on the top 62 of the pedestal 60, and the lowermost portion or rear of the ramp or track section 10 engaging the top of the flat 61. It is appreciated that when mounted in such operable position, the upper or inner end portion 26 of track or ramp section 11 will extend only a short distance over the end of the pedestal 60 to permit front wheel 13 of vehicle 14 to drive up and beyond the ramp end portion 26 as it moves forward on the pedestal 60 to the retained position illustrated in FIGS. 1 and 2.

After vehicle 14 has driven the ramp under its own power to the position where its front wheel 73 is held by abutment 70 from forward movement, chains 63, 64 and 71 are suitably connected to frame or anchoring parts of vehicle 14 and suitable fasteners (not shown) on flat 61 to secure the vehicle 14 rigidly with respect to the top 61.

Thereafter, the track structure 13 is disposed on the wheels 17 and 18 of the forward vehicle, as illustrated in FIG. 1, with the cleat 50 disposed on the top of the tire 17 and the track support or mounting member 32 disposed on the top of the tire 18. The lower end portion of the track or channel section 10 is engaged with the top of the flat 61.

A suitable length of 4x4 or equivalent slide or support 65, the purpose of which will become apparent, may be tied by straps or bands or the like 66 to the upper surface of the flat 15 adjacent the cab 67 of truck 14. The length of support 65 is such that its rear end terminates at the front end of section 12. The support 65 is adapted to engage under a frame member, such as the axle support of the second vehicle 14. Therefore, when the second vehicle 114 is driven up the track structure 13, the slide or support member 65 will engage under the framework of vehicle 114 as its wheel 73 leaves track section 12. Thereafter, the vehicle 114 under its own power drives forward sliding upwardly along the support 65.

Because of the angular inclination of the support 65, the forward end portion, including the tire 73, of the rearward vehicle 114, is elevated sufficiently to lift the rearward vehicle from the track structure 13 to the position illustrated in FIG. 2. Once the rearward vehicle 114 has assumed the position illustrated in FIG. 2, it is secured to the flat 61 by chains or cables 68, 69 and 70, in any suitable manner, such as connecting opposite chain ends to accessible frame portions and fasteners (not shown) on flat 61.

Thereafter, the ramp and bridge comprising the connected together sections 10, 11 and 12, are removed from the position shown in FIG. 1 and transferred to the position shown in FIG. 2, in preparation for saddle mounting of yet an additional vehicle (not shown). The procedure may be repeated until flat 61 is unable to accommodate any additional or further vehicles. Vehicles of varying sizes may be saddle mounted in the aforedescribed manner to make most efficient use of the shipping flat area 61.

To facilitate handling of the track sections 10, 11 and 12, the pins 27 and 54 may be removed to separate the ramp or track sections 11 and 12 from each other and from the track holder or support member 32. Thereby, a device which can be manipulated by a single employe who can, by use of the track structure 13 in a manner heretofore indicated, perform all of the mounting operations on a rail flat car by himself. Furthermore, when the loading operation is completed, the track structure 13 is readily and easily storable because of its features of disassembly in the manner and by reason of the structure heretofore indicated.

Of substantial significance is the fact that the track structure is inexpensive and is portable and successively re-usable, as it is not required in the securance of the vehicles once they have been mounted in positions for transport thereof. Accordingly, no capital equipment of consequence other than the flat car itself is engaged during vehicle shipment.

When the vehicles 14 and 114 have reached their destination and unloading thereof is required, the sections 10, 11 and 12 are re-assembled and mounted on the rearmost vehicle in the position illustrated in FIG. 2. Under its own power, the rearmost vehicle then merely drives off the slide 65 and onto the track bridge 12 and down the ramp comprising sections 11 and 10.

The removal procedure is then repeated until all loaded vehicles have been removed from flat 61. After the final vehicle has been removed, the track structure 13 comprising the connected together sections 11, 12 and the holding or connector member 32 may be again separated and thereafter stored for subsequent use.

As many substitutions or changes could be made in the above described construction and method, and as many apparently widely different embodiments of the invention within the scope of the claims could be constructed without departing from the scope and spirit thereof, it is intended that all matter contained in the accompanying specifications shall be interpreted as being illustrative and not in a limiting sense.

What is claimed is:

1. A portable device for loading trucks in saddle mount position and comprising:
   track means including an elongated track capable of being disposed angularly in a vertical plane and of having a lower end portion bearing against a stationary surface, and
   an elongated arcuate track mounting member releasably connected to an upper end portion of said track, said arcuate track mounting member having a surface portion capable of being placed in abutting engagement with a section of the outermost circumferential surface of the rearwardmost tire of a motor truck having a pair of rear tires lying substantially in a common vertical plane, said surface portion having a radius of curvature substantially corresponding to the radius of curvature of said outermost circumferential surface of said rearwardmost tire.

2. The device defined in claim 1 in which the track means includes
   a flat bridge releasably connected at one end portion to said mounting member, said bridge being extendible substantially horizontally from said mounting members and having an end portion capable of being supported by the forwardmost tire of said pair of rear tires lying substantially in a common vertical plane.

3. A portable device for loading trucks in saddle mount position and comprising
   an arcuate base holder adapted to be mounted on top of a stationary rear truck tire;
   a pair of parallel ears secured to and extending upwardly from said base holder;
   an angular ramp at its upper end portion disposed between and releasably secured to said ears, and
   connector means for releasably securing said ramp to said ears.

4. The device defined in claim 3 further characterized by
   a pair of parallel lugs secured to and extending upwardly from said base holder;
   a horizontal bridge at its inner end portion disposed between and releasably secured to said lugs;
   a tire gripping cleat mounted on a forward end portion of said bridge and adapted to be mounted on top of the forward of a pair of rear truck tires, and
   a connector means for releasably securing said horizontal bridge to said lugs.

5. A portable device for loading trucks in saddle mount position and comprising
   an arcuate base holder adapted to be mounted on top of a stationary truck tire circumferentially thereof;
   two pair of parallel upwardly extending ears carried by said arcuate base holder in spaced apart relationship longitudinally thereof,
      said pairs of ears having transversely aligned first apertures therein;
   an elongated channel-like track having one end portion releasably connected to and disposed between one pair of said ears,
      said track angularly disposed in a vertical plane and extending rearwardly from said base holder;
   an elongated channel-like bridge having one end portion releasably connected to and disposed between another pair of said ears,
      said bridge horizontally disposed in and extending forwardly from said base holder,
      said track and said bridge having second apertures therein aligned with the first apertures;
   manually withdrawable ties disposed in said first apertures and said second apertures whereby said track and said bridge are releasably secured to said base holder;
   a tire gripping cleat carried on a forward end portion of said bridge and adapted to be mounted on the forward of a pair of rear truck tires, and
   a rearmost channel-like short track section rigidly secured at its upper end portion to a rear end portion of said track and disposed in a common plane with said track at an angle to the horizontal greater than the angle thereto of said track.

6. A method for loading trucks on a carrier comprising the steps of
   driving a first truck up a mounted ramp to dispose the first truck chassis at an incline;
   remounting the ramp on a rear tire of the first truck;
   driving a second truck up the ramp;
   driving the second truck under its own power off the ramp and forwardly at an incline provided by the first truck chassis, and
   removing the ramp from the rear tire of the first truck.

7. The method defined in claim 6 further characterized by the step of engaging a slide under the chassis of the second truck as it drives off the ramp and forwardly at an incline.

References Cited by the Examiner

UNITED STATES PATENTS

| | | | |
|---|---|---|---|
| 1,307,199 | 6/1919 | Heyer | 193—5 X |
| 2,567,100 | 9/1951 | Carey | 296—1 |

FOREIGN PATENTS

| | | |
|---|---|---|
| 535,133 | 10/1931 | Germany. |
| 243,628 | 12/1925 | Great Britain. |

GERALD M. FORLENZA, *Primary Examiner.*

ALBERT J. MAKAY, *Examiner.*